United States Patent
Agarwal et al.

(10) Patent No.: US 11,886,723 B2
(45) Date of Patent: Jan. 30, 2024

(54) STORAGE FOR MULTI-CLOUD DATABASE AS A SERVICE

(71) Applicant: SAP SE, Walldorf (DE)

(72) Inventors: Prateek Agarwal, Pune (IN); Paresh Rathod, Pune (IN); Samar Desai, Pune (IN); Shrikant Awate, Pune (IN); Amit Pathak, Pune (IN); Dheren Gala, Pune (IN); Mitali Yadav, Pune (IN)

(73) Assignee: SAP SE, Walldorf (DE)

( * ) Notice: Subject to any disclaimer, the term of this patent is extended or adjusted under 35 U.S.C. 154(b) by 36 days.

(21) Appl. No.: 17/455,749

(22) Filed: Nov. 19, 2021

(65) Prior Publication Data
US 2023/0161490 A1  May 25, 2023

(51) Int. Cl.
*G06F 3/00* (2006.01)
*G06F 3/06* (2006.01)

(52) U.S. Cl.
CPC .......... *G06F 3/0632* (2013.01); *G06F 3/0604* (2013.01); *G06F 3/067* (2013.01); *G06F 3/0644* (2013.01)

(58) Field of Classification Search
None
See application file for complete search history.

(56) References Cited

U.S. PATENT DOCUMENTS

| | | | |
|---|---|---|---|
| 7,603,529 B1* | 10/2009 | MacHardy | G06F 3/0689 |
| | | | 711/170 |
| 9,003,157 B1* | 4/2015 | Marshak | G06F 3/0644 |
| | | | 711/170 |
| 2022/0075544 A1* | 3/2022 | Gupta | G06F 3/065 |

* cited by examiner

*Primary Examiner* — Midys Rojas
(74) *Attorney, Agent, or Firm* — Buckley, Maschoff & Talwalkar LLC (57) ABSTRACT

According to some embodiments, a system, method and non-transitory, computer readable medium are provided comprising a memory storing processor-executable program code; and a processing unit to cause the system to: receive a range of persistent volume disk size values from a cloud service provider; receive a value for an upper bound of a number of persistent volume disks attachable to a virtual machine per the cloud service; determine a number of persistent volume disks based on the upper bound, wherein the number is at least two; generate a plurality of configurations of the determined number of persistent volume disks, wherein a configuration is provided for each persistent volume disk size value, and each configuration divides the persistent volume disk size value between two or more persistent volume disks; and aggregate the generated plurality of configurations in a decision table. Numerous other aspects are provided.

19 Claims, 11 Drawing Sheets

FIG. 1A

| DISK TIER NAME | DISK SIZE | PRICE PER MONTH | MAX IOPS |
|---|---|---|---|
| P4 | 32 GB | $5.28 | 120 |
| P6 | 64 GB | $10.21 | 240 |
| P10 | 128 GB | $19.71 | 500 |
| P15 | 256 GB | $38.02 | 1100 |
| P20 | 512 GB | $73.22 | 2300 |
| P30 | 1 TB | $125.17 | 5000 |
| P40 | 2 TB | $259.05 | 7500 |
| P50 | 4 TB | $495.57 | 7500 |
| P60 | 8 TB | $946.08 | 16000 |
| P70 | 16 TB | $1802.06 | 18000 |

FIG. 1B

SINGLE PV DESIGN

| DISK TIER NAME | DISK SIZE | PRICE PER MONTH | MAX IOPS |
|---|---|---|---|
| P40 | 2 TB | $259.05 | 7500 |
| TOTAL | 2 TB | $259.05 | 7500 |

```
1  # Sizes of a single PVs to be requested from hyperscaler in sorted order of size
2  pvSizes = [32,64,128,256,512,1*1024,2*1024,4*1024,8*1024,16*1024]
3  # number of PVs allowed
4  numberPVs = 4
5
6  def generateAllPVConfigs():
7      # base tier is the smallest sized tier among the available tiers
8      baseTier = pvSizes[0]
9
10     # first config is to start with all PVs at smallest tier
11     # e.g. for numberPVs = 4 [PV1=16, PV2=16, PV3=16, PV4=16]
12
13     # one config represents size of each PV
14     # e.g. for numberPVs = 4 config = [PV1_size, PV2_size, PV3_size, PV4_size]
15     currentPVConfig = [baseTier for i in range(0, numberPVs)]
16
17     # allPVConfigs = collection of all configurations possible with 'numberPVs' PVs
18     allPVConfigs = [currentPVConfig[:]]
19
20     # Pick a higher tier of each PV until all PVs have reached the higher tier
21     # repeat for next available tier
22     for tierIndex in range(1, len(pvSizes)):
23         nextTier = pvSizes[tierIndex]
24         for pvIndex in range(0, numberPVs):
25             currentPVConfig[pvIndex] = nextTier
26             allPVConfigs.append(currentPVConfig[:])
27
28     return allPVConfigs
```

FIG. 4

| USER INPUT (GB) | PERSISTENT VOLUME SIZES (GB) | | | |
|---|---|---|---|---|
| DATA SIZE/LOG SIZE | PV1 | PV2 | PV3 | PV4 |
| 128 | 32 | 32 | 32 | 32 |
| 160 | 64 | 32 | 32 | 32 |
| 192 | 64 | 64 | 32 | 32 |
| 224 | 64 | 64 | 32 | 32 |
| 256 | 64 | 64 | 64 | 64 |
| 320 | 128 | 64 | 64 | 64 |
| 384 | 128 | 128 | 64 | 64 |
| 448 | 128 | 128 | 128 | 64 |
| 512 | 128 | 128 | 128 | 128 |
| 640 | 256 | 128 | 128 | 128 |
| 768 | 256 | 256 | 128 | 128 |
| 896 | 256 | 256 | 256 | 128 |
| 1024 | 256 | 256 | 256 | 256 |
| 1280 | 512 | 256 | 256 | 256 |
| 1536 | 512 | 512 | 256 | 256 |
| 1792 | 512 | 512 | 512 | 256 |
| 2048 | 512 | 512 | 512 | 512 |
| 2560 | 1024 | 512 | 512 | 512 |
| 3072 | 1024 | 1024 | 512 | 512 |
| 3584 | 1024 | 1024 | 1024 | 512 |
| 4096 | 1024 | 1024 | 1024 | 1024 |
| 5120 | 2048 | 1024 | 1024 | 1024 |
| 6144 | 2048 | 2048 | 1024 | 1024 |
| 7168 | 2048 | 2048 | 2048 | 1024 |
| 8192 | 2048 | 2048 | 2048 | 2048 |
| 10240 | 4096 | 2048 | 2048 | 2048 |
| 12288 | 4096 | 4096 | 2048 | 2048 |
| 14336 | 4096 | 4096 | 4096 | 2048 |
| 16384 | 4096 | 4096 | 4096 | 4096 |
| 20480 | 8192 | 4096 | 4096 | 4096 |
| 24576 | 8192 | 8192 | 4096 | 4096 |
| 28672 | 8192 | 8192 | 8192 | 4096 |
| 32768 | 8192 | 8192 | 8192 | 8192 |
| 40960 | 16384 | 8192 | 8192 | 8192 |
| 49152 | 16384 | 16384 | 8192 | 8192 |
| 57344 | 16384 | 16384 | 16384 | 8192 |
| 65536 | 16384 | 16384 | 16384 | 16384 |

FIG. 5

| USER INPUT | PERSISTENT VOLUME 1 PROPERTIES | | | PERSISTENT VOLUME 2 PROPERTIES | | |
|---|---|---|---|---|---|---|
| DATA SIZE/LOG SIZE | SIZE | TIER | IOPS | SIZE | TIER | IOPS |
| 64 GB | 32 GB | P04 | 120 | 32 GB | P04 | 120 |
| 96 GB | 64 GB | P06 | 240 | 32 GB | P04 | 240 |
| 128 GB | 64 GB | P06 | 240 | 64 GB | P06 | 240 |
| 192 GB | 128 GB | P10 | 500 | 64 GB | P06 | 500 |
| 256 GB | 128 GB | P10 | 500 | 128 GB | P10 | 500 |
| 384 GB | 256 GB | P15 | 1100 | 128 GB | P10 | 1100 |
| 512 GB | 256 GB | P15 | 1100 | 256 GB | P15 | 1100 |
| 768 GB | 512 GB | P20 | 2300 | 256 GB | P15 | 2300 |
| 1024 GB | 512 GB | P20 | 2300 | 512 GB | P20 | 2300 |
| 1536 GB | 1024 GB | P30 | 5000 | 512 GB | P20 | 2300 |
| 2048 GB | 1024 GB | P30 | 5000 | 1024 GB | P30 | 5000 |
| 3072 GB | 2048 GB | P40 | 7500 | 1024 GB | P30 | 5000 |
| 4096 GB | 2048 GB | P40 | 7500 | 2048 GB | P40 | 7500 |
| 6144 GB | 4096 GB | P50 | 7500 | 2048 GB | P40 | 7500 |
| 8192 GB | 4096 GB | P50 | 7500 | 4096 GB | P50 | 7500 |
| 12288 GB | 8192 GB | P60 | 16000 | 4096 GB | P50 | 7500 |
| 16384 GB | 8192 GB | P60 | 16000 | 8192 GB | P60 | 16000 |
| 24576 GB | 16384 GB | P70 | 18000 | 8192 GB | P60 | 18000 |
| 32768 GB | 16384 GB | P70 | 18000 | 16384 GB | P70 | 18000 |

| DATA/LOG SIZE (GB) |
|---|
| 64 |
| 96 |
| 128 |
| 192 |
| 256 |
| 384 |
| 512 |
| 768 |
| 1024 |
| 1536 |
| 2048 |
| 3072 |
| 4096 |
| 6144 |
| 8192 |
| 12288 |
| 16384 |
| 24576 |
| 32768 |

| TOTAL STORAGE (GB) | DATA (GB) | LOG (GB) |
|---|---|---|
|  | 64 | 64 |
| 256 | 192 | 64 |
| 512 | 384 | 128 |
| 1024 | 768 | 256 |
| 2048 | 1536 | 512 |
| 4096 | 3072 | 1024 |
| 8192 | 6144 | 2048 |
| 16384 | 12288 | 4096 |
| 32768 | 24576 | 8192 |
| 65536 | 32768 | 32768 |

STORAGE FOR MULTI-CLOUD DATABASE AS A SERVICE

BACKGROUND

Cloud computing is a centralized approach to process data and works well when it comes to power and capacity. It allows scalability for organizations, and the pay-as-you-go model makes it an affordable approach to smaller organizations that do not want to build out an entire computing infrastructure in-house. In cloud computing, hyperscalers are Platform as a Service (PaaS) vendors that may offer Infrastructure as a Service (IaaS) to help other organizations seeking digital platforms. Non-exhaustive examples of hyperscalers include AMAZON® WEB Services ("AWS"), MICROSOFT® Azure, and Google® Cloud Platform ("GCP"). Essentially, hyperscalers manage the physical infrastructure while the end user customizes a virtualized computing infrastructure.

In some cases, a user may require a level of data storage performance. However, a hyperscaler may provide this storage performance only in conjunction with storage devices which are larger than required by the user. These larger storage devices are associated with higher pay-as-you-go fees than smaller storage devices. Accordingly, the user is required to provision storage to a size larger than needed and pay the fee commensurate with that larger storage in order to achieve the required performance.

It would therefore be desirable to facilitate cloud provisioning of systems which efficiently satisfy various combinations of data storage size and data storage performance requirements.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Database-as-a-Service (DBaaS), which may also be known as "Managed Databases", may refer to software that enables users to set-up, operate and scale databases using a common set of abstractions (primitives), without having to either know or care about the exact implementation of those abstractions for the specific database. For example, a developer could instantiate a database instance using the same set of API calls or UI clicks regardless of whether the database was MySQL, Oracle or MogoDB. It is the platform's responsibility to implement backup, cluster resizing or any other abstract operation correctly for each of the underlying databases that the platform supports.

Setting up a database on a cloud involves provisioning a virtual machine (VM) on which to run it, installing the database, and configuring it according to a set of parameters. DBaaS is often delivered as a component of a more comprehensive platform, which may provide additional services such as IaaS. The DBaaS solution would request resources from the underlying IaaS/PaaS provider (e.g., a hyperscaler) which would automatically manage provisioning compute, storage and networking components as needed, as well as configuring them properly and installing the database software, essentially removing the need for IT to be involved in this aspect.

The end user who consumes these cloud resources/services may be tasked with determining the size of their data storage needs. In cloud computing, the performance of the storage layer depends on the size of the underlying disk; so if a faster disk is desired, a larger disk is needed. This is unlike an on-premise ("on-prem") system where different disk types determine performance, and each is a fixed size. As such, in a cloud environment, the end user cannot choose individual disk sizes, but instead have a single disk storage provisioned by the hyperscaler based on data storage need. This implies that the end user may be required to provision storage to a size larger than needed (and pay the fee commensurate with that larger size in order to achieve the required performance. Additionally, the disk size determined by the hyperscaler may be more than needed by the end user.

Figure 1A:
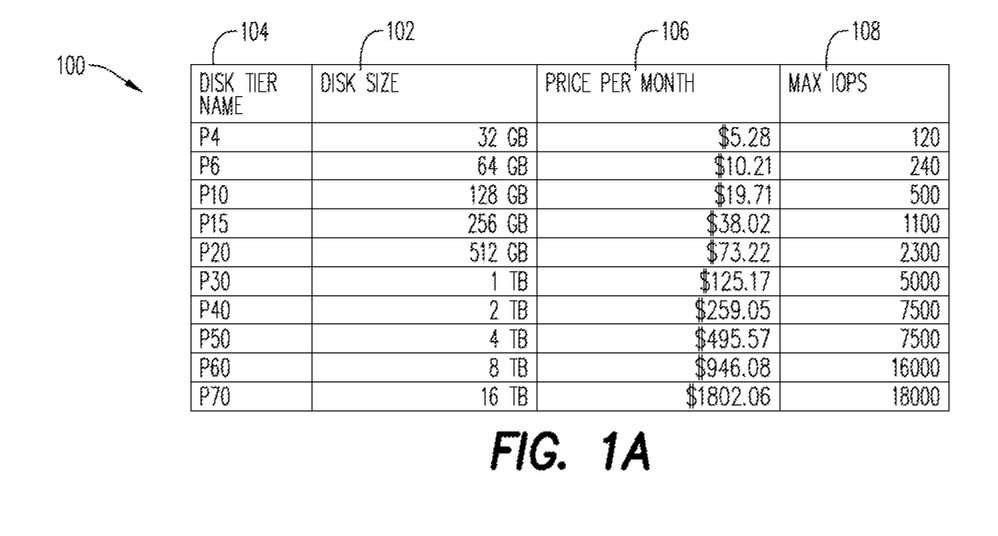
FIG. 1A is a non-exhaustive example of a PV chart.
Figure 1B:
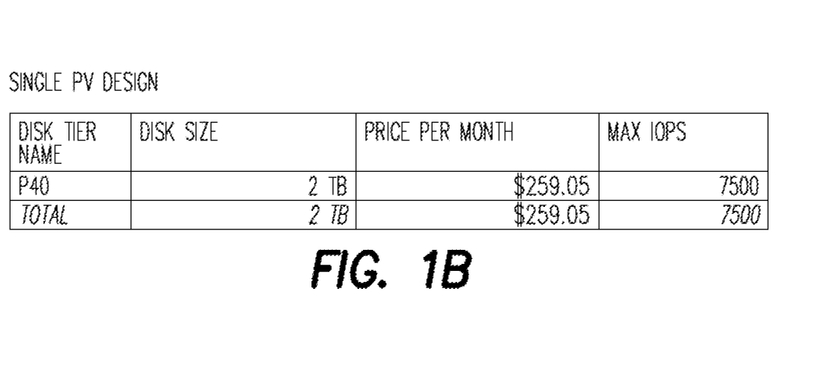
FIG. 1B is a non-exhaustive example of PV design based on the PV chart of FIG. 1A.

As a non-exhaustive example, consider a scenario where an end user has data with the size of 1.5 TB. The chart 100 in FIG. 1A is from a hyperscaler, and provides the storage offered as "disk tier" where price and performance (Input/output operations per section ("IOPS"), with a higher number meaning better performance) are based on tier and disk size. In particular, the chart 100 includes different disk sizes 102 that are correlated with a disk tier name 104, a price per month 106 and a Max IOPS 108. A single disk/persistent volume (PV), as provided by the hyperscaler, would force the end user to have P40 provisioned to them since it has 2 TB of storage as shown in FIG. 1B. In this scenario, 0.5 TB of volume would remain unused, even though the end user is paying for it. The inventors note that it is unlikely that an organizations transactional data would grow so large in a short amount of time to be able to use the 0.5 TB, and until the data requirements meet this level, the additional storage capacity is a waste.

Embodiments provide a multi-PV module to address these problems. In embodiments, the multi-PV module assigns multiple cloud disks for a storage tier of a service instance (VI, . . . VN), where N is the number of PVs. The end user may indicate a total storage size (Total Volume in GBs), and the multi-PV module provisions N volumes such that $TV=|V1|+|V2|+ \ldots +|VN|$, wherein $|Vi|$ is the size of the $i^{th}$ volume. It is noted that for $|V_i|>|V_j|$ then $P_i>P_j$ where P stands for performance throughput, so that a hyperscaler provides higher throughput on a larger device.

Figure 2:
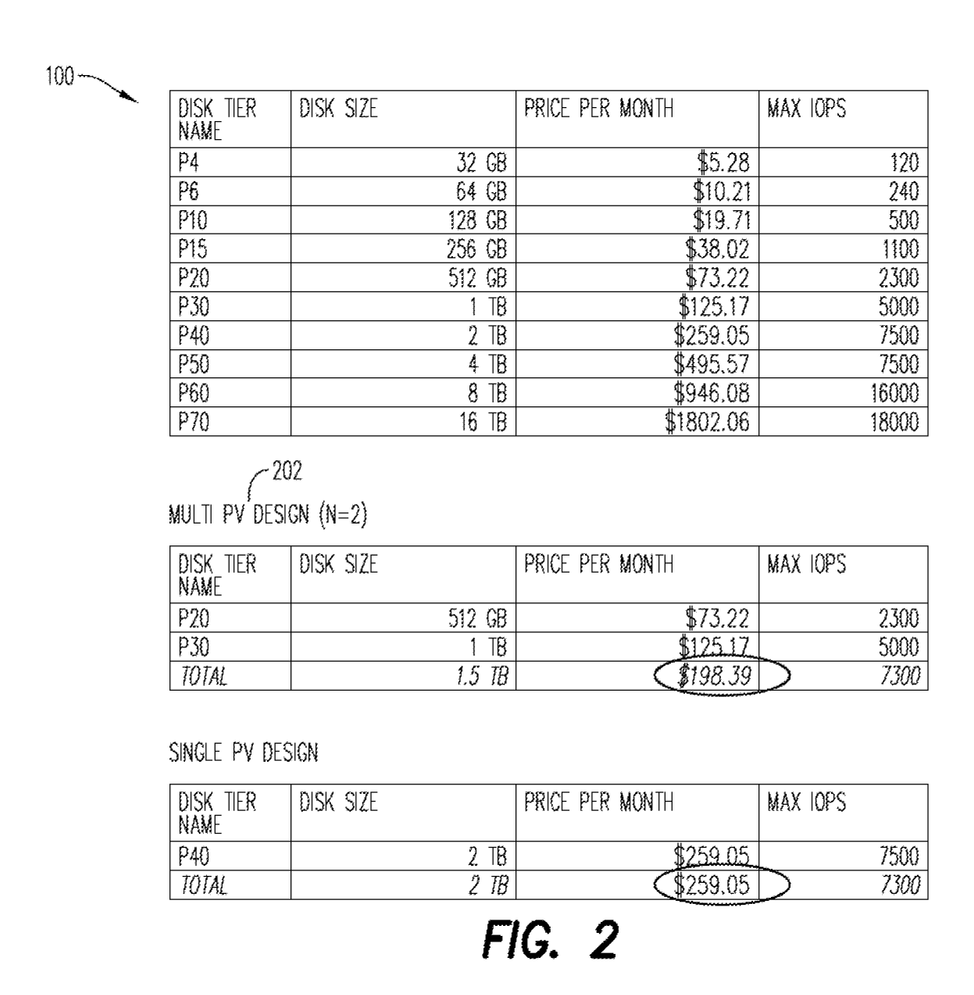
FIG. 2 is the non-exhaustive example of FIGS. 1A and 1B including a multi-PV design according to some embodiments.

Continuing with the non-exhaustive example provided above in FIG. 1A, where the end user data requirement is of a size of 1.5 TB, the multi-PV module may assign, for N=2, a first PV of 1 TB (from disk tier P30) and a second PV of 512 GB (from disk tier P20), as shown in the table 202 of FIG. 2, which will more closely fit the user's needs. It is noted that the multi-PV design costs $198/month, while the single PV design costs $259/month. It is also noted that while individually the P20 and P30 disks have a lower performance (e.g., are slower at 2300 IOPS, 5000 IOPS, respectively) than the P40 disk (7500 IOPS), in a typical use case scenario both disks would be used concurrently for IOPS when the server is handling multiple user requests. In such a scenario, the storage layer may effectively give an added performance such that the IOPS of P20 and P30 may be combined (2300+5000) to have a Max IOPS of 7300, which may be relatively comparable to the 7500 IOPS of the single P40 disk.

In embodiments, the multi-PV module may also provision disks such that the range of values between the disks is not so large to avoid having a very slow disk and a very fast disk in the same instance. For example, it may be undesirable for a single instance to have a first PV of 1 TB and a second PV of 1 MB. The reason for this is that when data stored on the 1 TB PV is accessed, there may be a very fast system throughput, but if queries also need to access data stored on the 1 MB PV, suddenly the system throughput may decrease. In embodiments, there may be an upward bound 704 (FIG. 7) that denotes the maximum difference between the PVs for a performance balanced system. For a performance balanced system, the multi-PV module may, for example, provision the PVs such that they are all of the same storage ($|V1|=|V2|= \ldots |VN|$), or for all values if i,j where $1 \leq i,j \leq N$ design should ensure $|Vi|-|Vj| \leq B$, where B is the upper bound. In embodiments, the end user may be provided with logical constructs (LV1, . . . LVN) created over physical constructs (V1, . . . , VN) to create the database objects (e.g., tables, indexes etc.).

The present invention provides significant technical improvements to facilitate PV provisioning and data storage. The present invention is directed to more than merely a computer implementation of a routine or conventional activity previously known in the industry. The present invention provides improvement beyond a mere generic computer implementation as it provides: bounded performance characteristics whereby a database service instance would have disks of varying performance but the variance would have an upper bound for providing a performance-balanced system; abstraction/security in that the service does not expose its physical constructs (e.g., file, directory paths) are not exposed to the end user; decoupling the design of the cloud service from the storage design of the hyperscaler. Embodiments may also provide a multi-PV module that is hyperscaler agnostic in that the multi-PV module may be applied with any hyperscaler of choice for a service provider via the use of containerization, for example.

Figure 3:
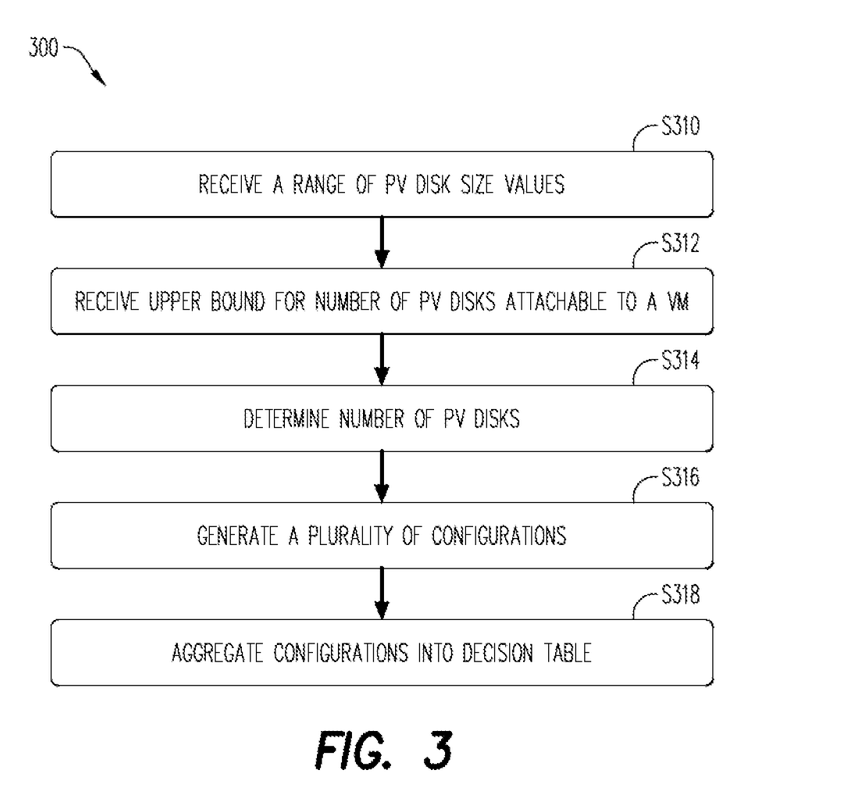
FIG. 3 illustrates a method to generate a decision table according to some embodiments.

Turning to FIG. 3, a method to determine a design/configuration of a particular number of PVs for data allocation is illustrated according to some embodiments. As used herein, the terms "design" and "configuration" may be used interchangeably. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein. As another example, a Multi-PV Platform 701 may be conditioned to perform the process 300, such that a processor 706 (FIG. 7) of the system 700 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to the design process 300, several factors may be considered. While a design with a larger value of N may provide more diverse values of Total Volume ("TV") to match the end user's data needs, there may be design aspects other than storage size. For example, some database servers may require separate physical media between log and data for performance and for the ability to better handle device failures. In those cases, a single database instance may require at least 2 PVs—one for data and one for log. The database data and log may have different sizing and performance considerations for the end user, so the end user may be provided with two independent sizes of TVdata and TVlog, where TVdata is the total volume in GBs for database devices for data and TVlog is the total volume in GBs for database devices for log. Another design aspect may be that multiple database instances may share a single Virtual Machine ("VM"), so the database device requirements may have to adhere to limitations of the VM. For example, hyperscalers may place an upper limit on the maximum number of disks that may be attached to a VM, so a higher number of N would reduce the maximum number of database instances that may be supported and may lead to wastage of compute and memory. To illustrate this, consider a VM from a hyperscaler with a limit of 64 disks. With N equal to two (2), each database instance that also has a rule for separate data and logs, would need four (4) PVs (two for data+two for log), where N refers to one of data or log. Thus, with this example, a single VM can host a maximum of 64/4=16 database instances. While the processes described herein may reference an N of two (2) or four (4), any suitable number of Ns may be pre-set.

Figure 7:
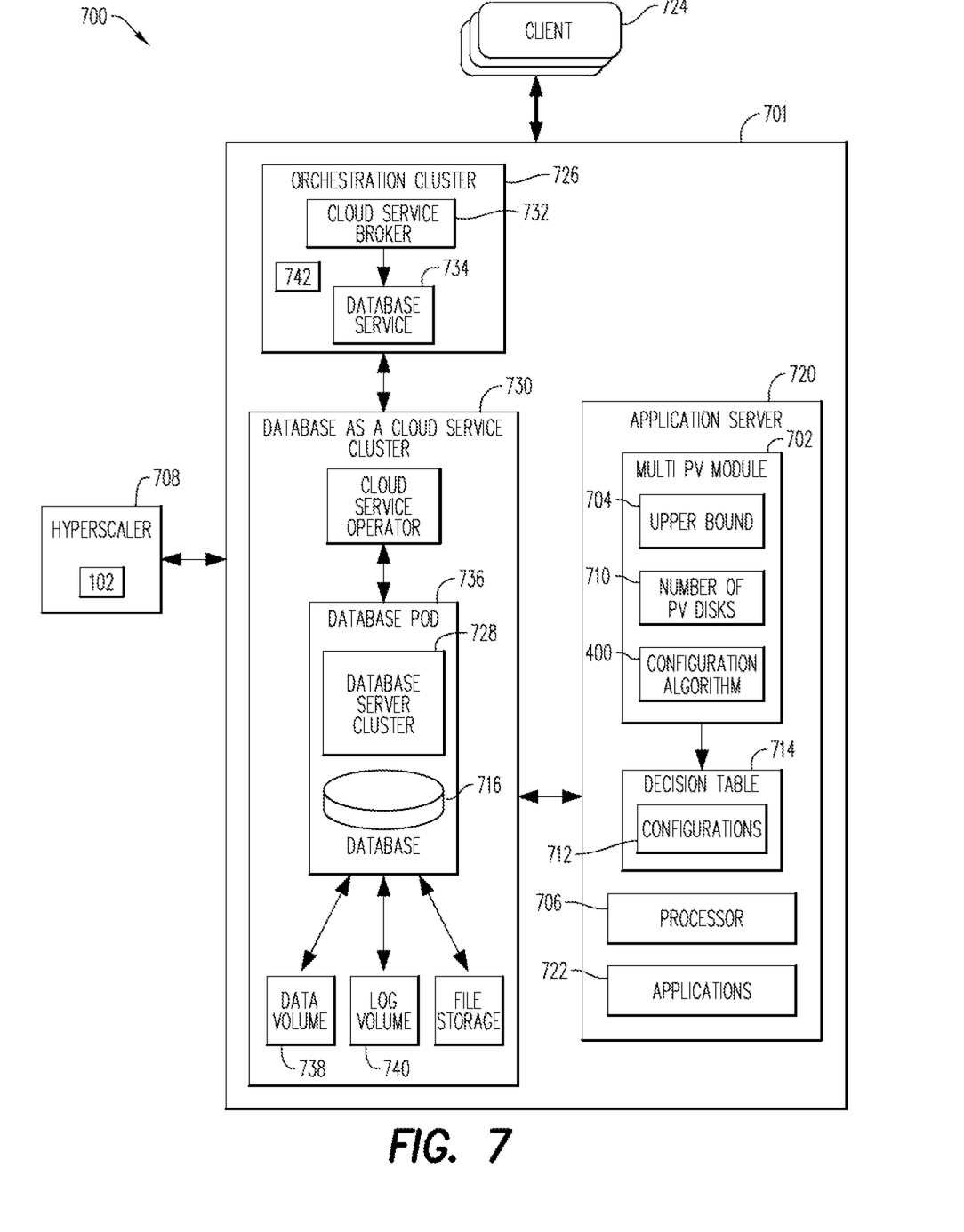
FIG. 7 is a high-level block diagram of a system in accordance with some embodiments.

Initially, at S310, a range of persistent volume (PV) disk size values 102 are received from a cloud service provider ("hyperscaler") 708 (FIG. 7). At S312, a value for an upper bound of a number of PV disks attachable to a virtual machine (VM) for the cloud service provider 708 is received, in addition to any rules that the data and log are stored on different disks. Then a number of PV disks (represented by "N") 710 are determined at S314 based on the upper bound.

In one or more embodiments, the number of PV disks 710 is at least two. In one or more embodiments, the multi-PV module 702 may determine an optimal number of disks based on the upper bound and data and log storage rules, where the optimal number uses the most amount of compute memory storage offered by the VM.

Consider, as an example, an end user needs sixteen (16) database instances using four disks for each instance. Continuing with the example described above for the VM with a limit of 64 disks and the rule for separate data and log storage, N=2 would mean that 16 data instances can be hosted and the compute memory storage offered by the VM is fully used and nothing is wasted (e.g., 4 PVs are used (2 for data and 2 for log) and 64/4=16). If, however, with this same example, N=3, then 6 PVs are used (3 for data and 3 for log) and 64/6=10.6. In this example (N=3), the maximum number of database instances that can be hosted by the VM is 10, and if each instance is using four disks, then 40 disks are being consumed from the VM. However, in this example, 64 disks are available, so there is low (less than complete) utilization of the compute memory storage.

After the number of PV disks 710 are determined at S314, a plurality of configurations 712 for the determined number of PV disks 710 are generated by the multi-PV module 702 at S316. In one or more embodiments, a configuration 712 may be provided for each PV disk size value of the range 102 of PV disk size values. Each configuration divides the PV disk size value between two or more PV disks 710. In embodiments, for a given storage (data or log) of X, two PV sizes may be calculated by the following:
1. PV1=X/2
2. If X/2 is not a power of 2 then find the nearest power of two (max size) and that will become PV1 size
3. PV2 size=X-PV1 size As a first non-exhaustive example, for X=768 GB
1. X/2=384
2. 384 is not a power of 2, so find the nearest power of 2. The nearest power of 2 is 512, so PV1 size=512 GB
3. PV2 size=768−512=256 GB As a second non-exhaustive example, for X=1024
1. X/2=512
2. 512 is a power of 2 hence PV1 size=512 GB
3. PV2 size=1024−512=512 GB It is noted that the above logic holds true for both storage provisioning and storage scale up.

Figure 4:
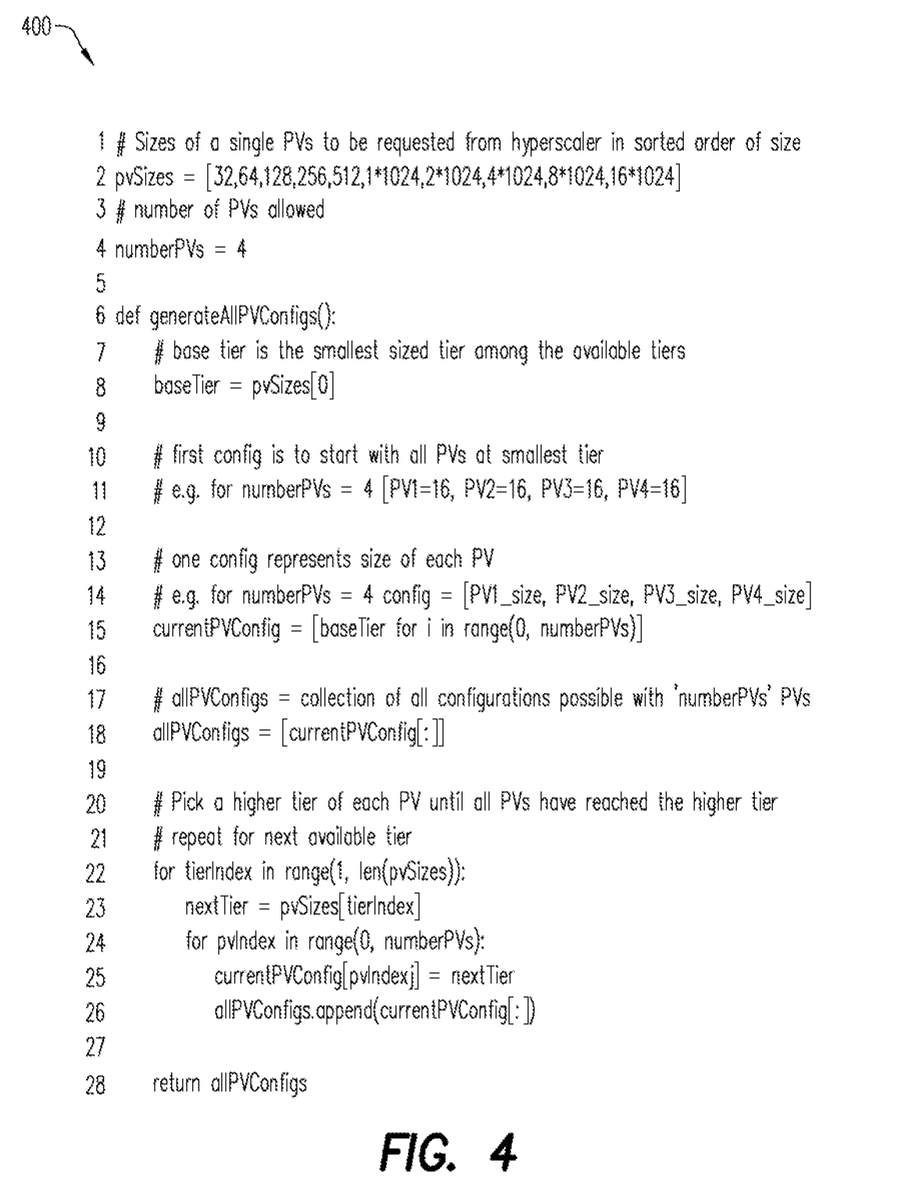
FIG. 4 illustrates an algorithm for generating configurations according to some embodiments.

Further, with respect to generating the plurality of configurations, a configuration algorithm 400, shown in FIG. 4 may be executed by the multi-PV module 702. As a first input, the range of disk sizes of a single PV 102 to be requested from the hyperscaler are received and are sorted in order of PV size. With respect to the chart 100 in FIG. 1A and FIG. 2, this would be equal to [32, 64, 128, 256, 512, 1*1024, 2*1024, 4*1024, 8*1024, 16*1024]. A second input is the number of PVs 710 allowed, as determined in S314. As a first example, the number of PVs is four. Some of the constraints include, but may not be limited to, a base tier is the smallest sized tier among the available tiers (e.g., baseTier=pvSizes [0]); the first configuration is to start with all PVs at the smallest tier (e.g., for numberPVs=4 [PV1=16, PV2=16, PV3=16, PV4=16]); one configuration represents the size of each PV (e.g., for number PVs=4, config= [PV1_size, PV2_size, PV3_size, PV4_size]) currentPVConfig=[baseTier for i in range (0, number PVs)]; all PVConfigs=collection of all configurations possible with 'numberPVs' such that allPVConfigs=[currentPVConfig[:]]; a higher tier of each PV is picked until all PVs have reached the higher tier; and then this is repeated for the next available tier.

The plurality of configurations generated at S316 may be aggregated in a decision table 714 at S318. The decision table 714 includes, for a given data size or log size 502, the configuration 504 or division of that data size/log size between the PV disks 710. It is noted that each PV configuration 504 is composed of either same sized PVs or if different sized PVs are chosen, then they are adjacent tiers in the hyperscaler range to provide a balanced performance.

Figure 5:
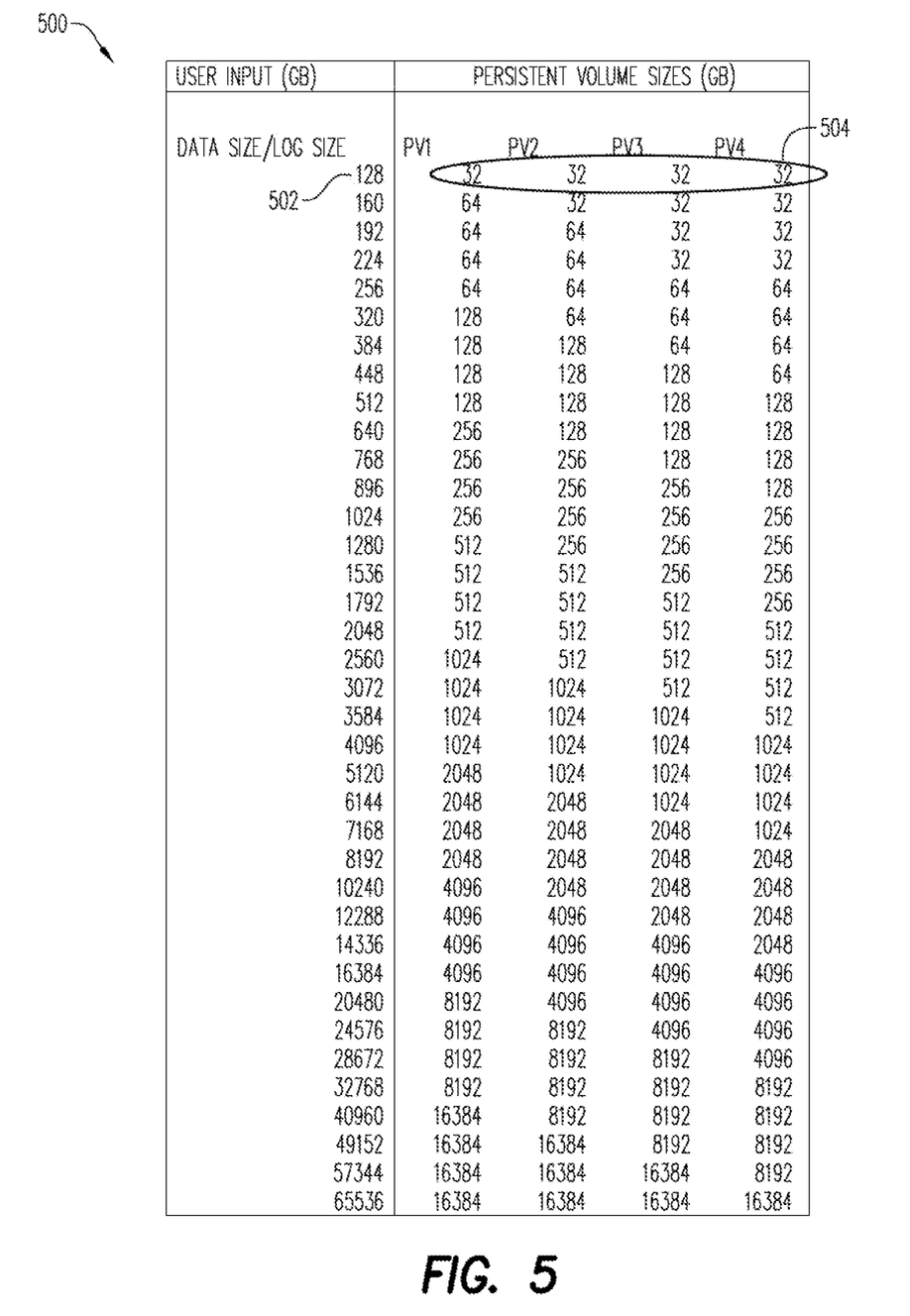
FIG. 5 illustrates a decision table for four PVs in accordance with some embodiments.

The output of executing the algorithm 400 with N=4, is the decision table 500, as shown in FIG. 5. As a non-exhaustive example, in a case the user inputs a data size of 192 GB, the multi-PV module 702 would provision 4 PVs with a configuration 504: 64 GB, 64 GB, 32 GB and 32 GB.

Figure 6:
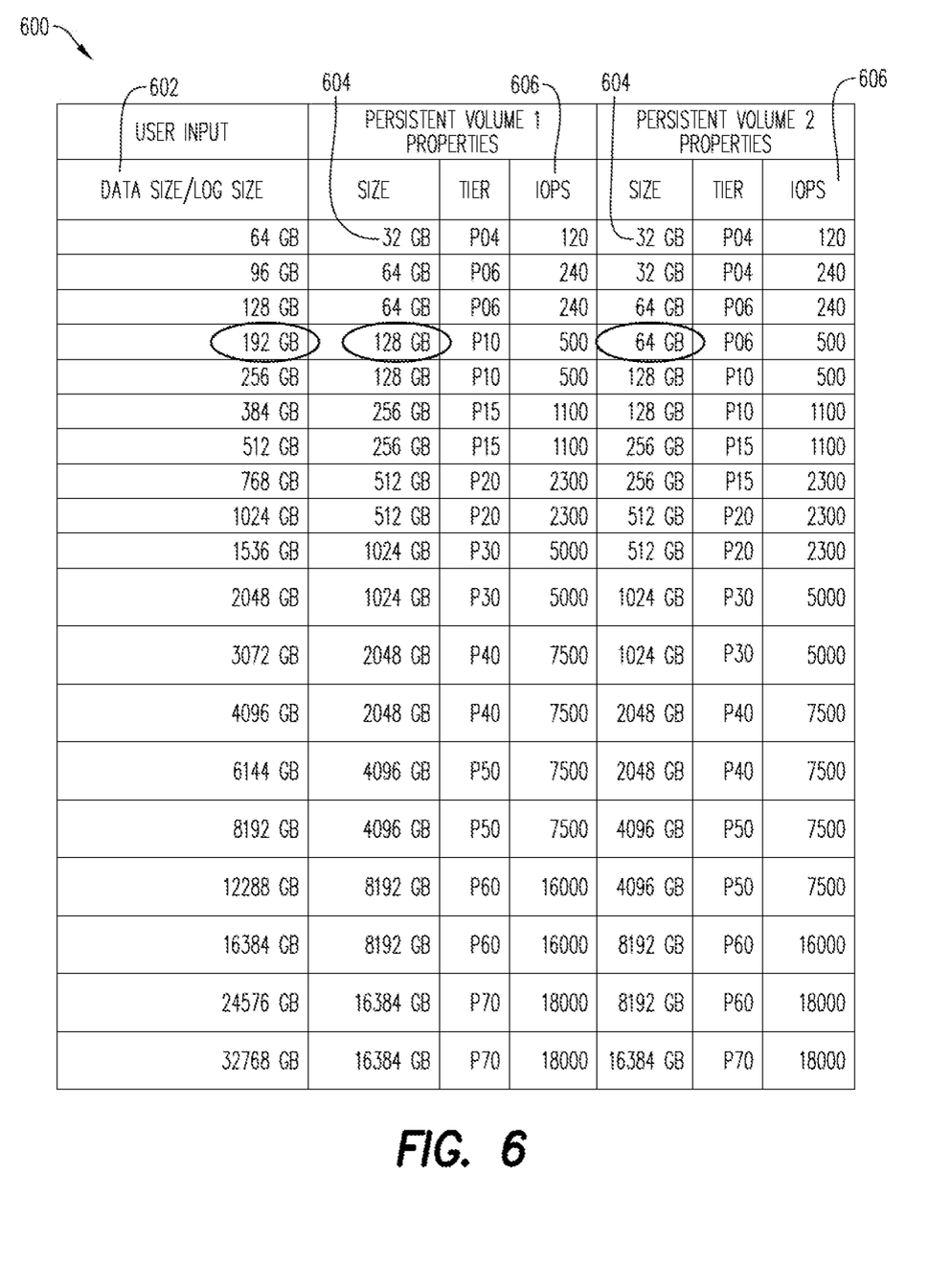
FIG. 6 illustrates a decision table for two PVs in accordance with some embodiments.

As another non-exhaustive example, the output of executing the algorithm 400 with N=2, is the decision table 600, as shown in FIG. 6. As a non-exhaustive example, in a case the user inputs a data size 602 of 192 GB, the multi-PV module 702 would provision 2 PVs with a configuration 604 of sizes: 128 GB and 64 GB. The decision table 600 shown in FIG. 6 also includes performance characteristics (IOPS) 606 for each of the PVs.

FIG. 7 provides a high-level architecture 700 of a system according to some embodiments. Embodiments are not limited to architecture 700. One or more components of the system architecture 700 may be located remote from one another and may be allocated in a cloud-computing environment. Such a cloud computing environment may elastically allocate and de-allocate compute (e.g., virtual machines) and storage (e.g., file-based, block-based, object-based) resources depending on demand, cost and/or other factors.

The system may include a multi-PV module 702, a database 716, a cloud service provider/hyperscaler 708, a database server 728, an application server 720, application(s) 722, and clients 724. Applications 722 may comprise server-side executable program code (e.g., compiled code, scripts, etc.) executing within application server 720 to receive queries from clients 724 and provide results to clients based on data of database 716. A client 724 may access the multi-PV module 702 executing within application server 720 to generate user interfaces 902, 904 (FIG. 9A) determine a configuration for PVs and to provision the PVs.

The cloud service provider 708 may include an orchestration cluster 726, a database server cluster 728, and a database as a cloud service cluster 730. As used herein a cluster may refer to a group of two or more connected servers that are configured with the same operating system, databases and applications. The orchestration cluster 726 may include cloud service broker 732 in communication with a database service 734. The cloud service broker 732 may be a software application that is responsible to accept requests on behalf of an application to provision and data store instances. The cloud service broker 732 may act as a "middleman" between the client's application/client and the database server cluster.

The database as a cloud service cluster 730 may be in communication with the orchestration cluster 726. The database as a cloud service cluster 730 may use technologies including, but not limited to, Kubernetes®, Docker® and Gardner (a Kubernetes-based service builder), to provide the databases as a service. In some embodiments, the database as a cloud service cluster 730 may orchestrate a database server within a database "docker" pod 736 with cloud disk(s) attached to store databases data volumes 738 and log volumes 740.

Application server 720 provides any suitable interfaces through which the clients 724 may communicate with the multi-PV module 702 or applications 722 executing on application server 720. For example, application server 720 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 722 executing on server 720 may communicate with database server 728 using database management interfaces such as, but not limited to, Open Database Connectivity (ODBC) and Java Database Connectivity (JDBC) interfaces. These types of applications 722 may use Structured Query Language (SQL) to manage and query data stored in database 716.

Database server cluster 728 serves requests to retrieve and/or modify data of database 716, and also performs administrative and management functions. Such functions may include snapshot and backup management, indexing, optimization, garbage collection, and/or any other database functions that are or become known. Database server 728 may also provide application logic, such as database procedures and/or calculations, according to some embodiments. This application logic may comprise scripts, functional libraries and/or compiled program code. Database server 728 may comprise any query-responsive database system that is or becomes known, including but not limited to a structured-query language (i.e., SQL) relational database management system.

Database 716 may store data used by at least one of: applications 722 and the multi-PV module 702. For example, database 716 may store one or more tables generated by and accessed by the multi-PV module 702 during execution thereof.

In some embodiments, the data of database 716 may comprise one or more of conventional tabular data, row-based data, column-based data, and object-based data. Moreover, the data may be indexed and/or selectively replicated in an index to allow fast searching and retrieval thereof. Database 716 may support multi-tenancy to separately support multiple unrelated clients by providing multiple logical database systems which are programmatically isolated from one another.

Database 716 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 724 may comprise one or more individuals or devices executing program code of a software application for presenting and/or generating user interfaces to allow interaction with application server 720. Presentation of a user interface as described herein may comprise any degree or type of rendering, depending on the type of user interface code generated by application server 720.

Figure 9A:
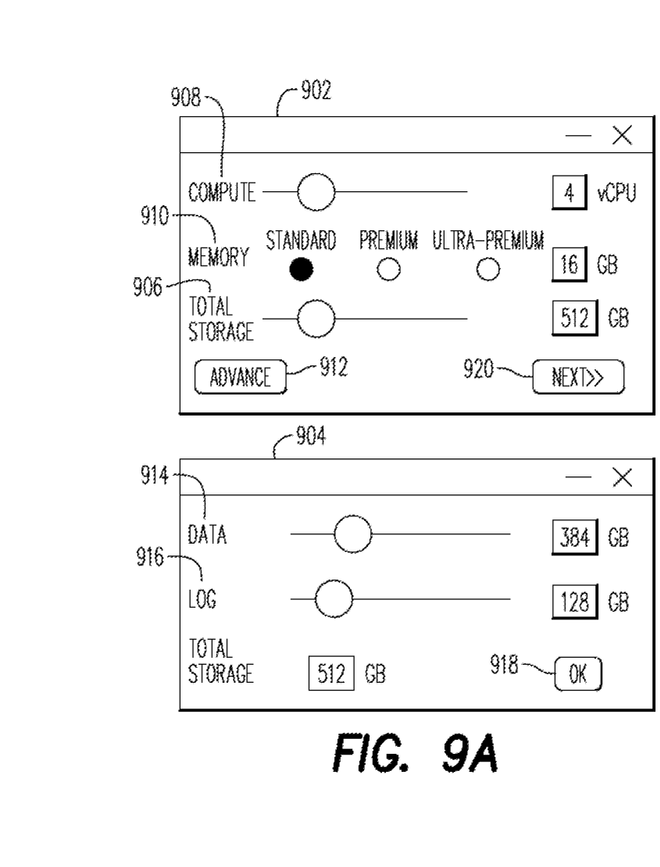
FIG. 9A illustrates two user interfaces according to some embodiments.

For example, a client 724 may execute a Web Browser to request and receive a Web page (e.g., in HTML format) from a website application 722 of application server 720 to provide the UI 902, 904 via HTTP, HTTPS, and/or Web-Socket, and may render and present the Web page according to known protocols. The client 724 may also or alternatively present user interfaces by executing a standalone executable file (e.g., an .exe file) or code (e.g., a JAVA applet) within a virtual machine.

Figure 8:
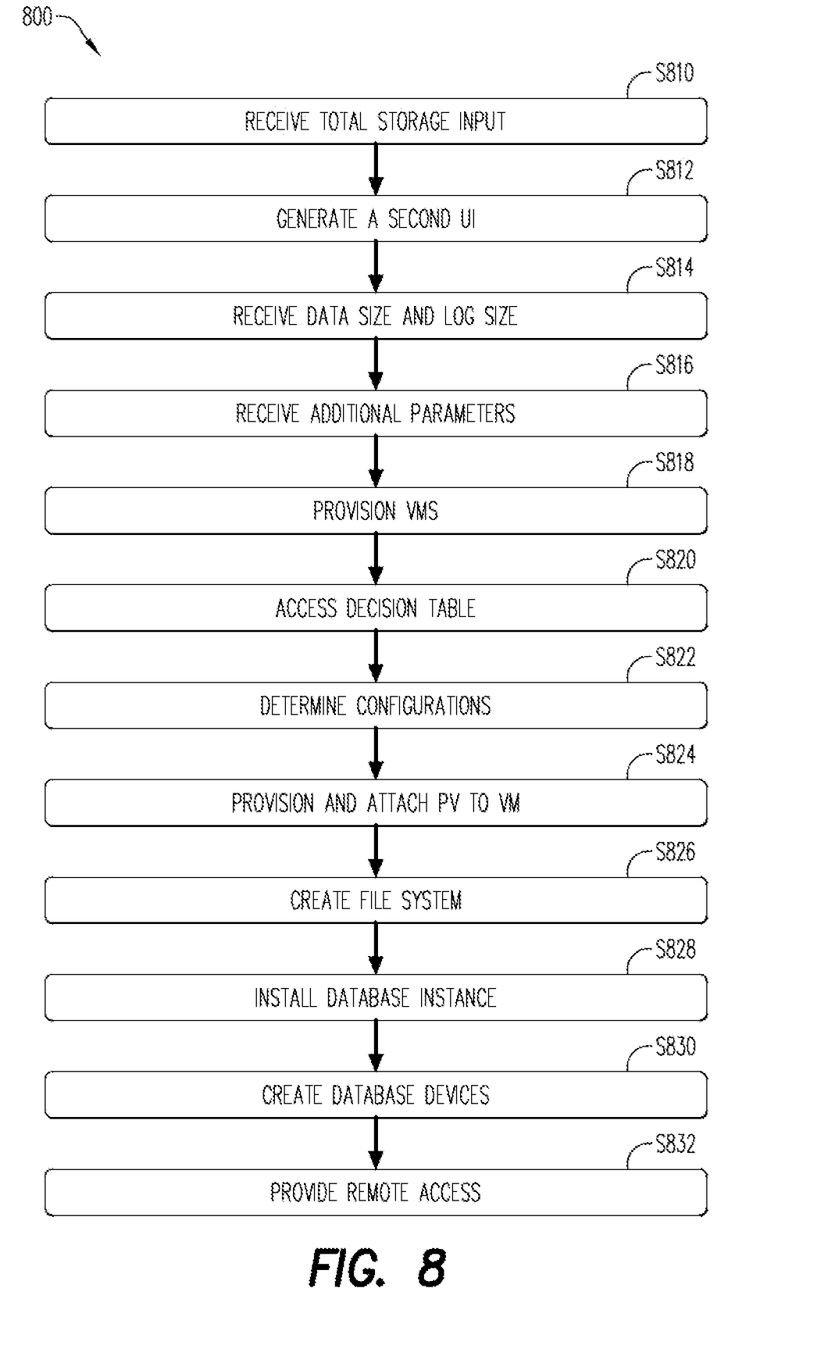
FIG. 8 illustrates a method according to some embodiments.
Figure 9B:
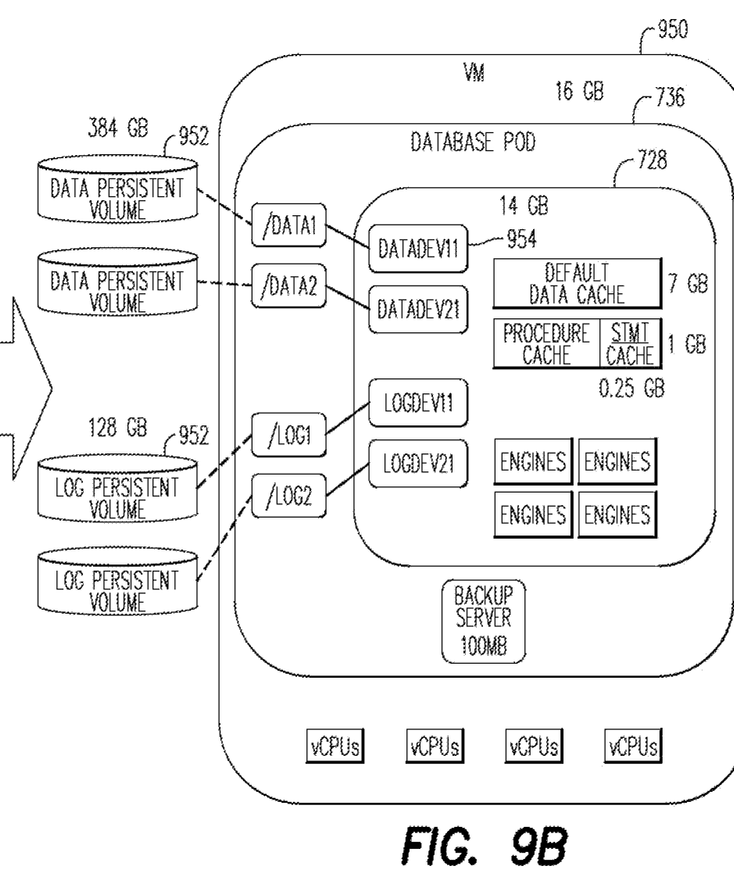
FIG. 9B illustrates an architecture based on the received input to the user interfaces of FIG. 4 in accordance with some embodiments.

Turning to FIGS. 8, 9A and 9B, a method (800) for configuring the memory based on a user request is provided. The database as a cloud service cluster 730 may provide to its end users (e.g., client 724) options to choose logical parameters like compute, memory and storage based on end user's application requires from a database server. Based on the values chosen by the end user, the multi-PV platform 701 orchestrates a cloud compute environment (virtual machines 950) and storage (PVs 952).

In embodiments, the method 800 may occur after the decision table 714 has been generated as described above with respect to FIG. 3. Additionally, and prior to the process 800, a number of PV disks 710 is pre-defined and the hyperscaler provider 708 is selected by the end-user.

Initially at S810, a first user interface 902 receives a total storage input 906, as well as a compute (number of vCPU 908) and memory level 910. The list of compute choices may be available from 4 to 60 in increments of 1. In some embodiments, the memory may be offered as a "ratio" of compute. There may be three memory choices available per compute choice: Standard, Premium and Ultra-premium, or any other suitable designation. The user may be shown absolute values when they make a choice of compute and memory ratio. The absolute memory value for a compute value may be derived by the following formula:

Standard: Memory=Compute×4

Premium: Memory=Compute×8

Ultra-Premium: Memory=Compute×16

As a non-exhaustive example, for vCPU of 4, the Standard would have a memory size of 16 (4×4), the Premium would have a memory size of 32 (4×8) and the Ultra-Premium would have a memory size of 64 (4×16).

Figure 10A:
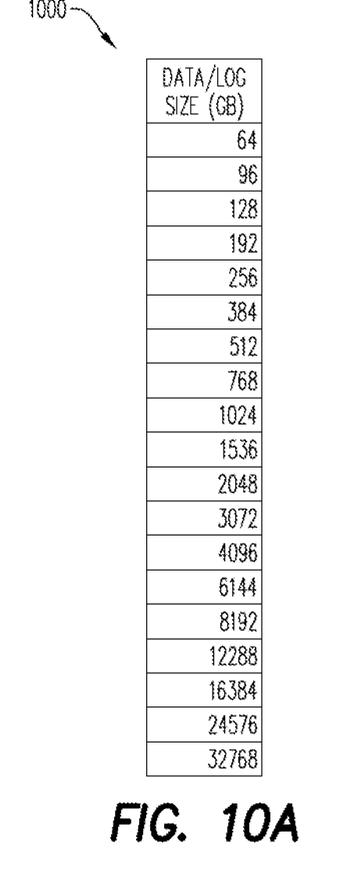
FIG. 10A is a non-exhaustive example of a table according to some embodiments.

Memory sizing may determine pod memory, memory, backup server memory and key components within the platform 701 which consume most memory. In some embodiments, storage sizing for an instance of a database service includes data and database log sizes used by the server running inside the instance. The storage size may not include storage size for backups. Storage sizes may be used for the devices (which may be created via 'disk init' SQL commands, or any other suitable commands). These devices may be logical devices created as files on hyperscaler persistent volumes. In embodiments, the system 700 may offer different choices of storage sizes, including a minimum and maximum storage size. The system 700 may offer varied but restricted choices of total data size and total log size. As a non-exhaustive example, the table 1000 in FIG. 10A shows the choices of total data/log size.

Figure 10B:
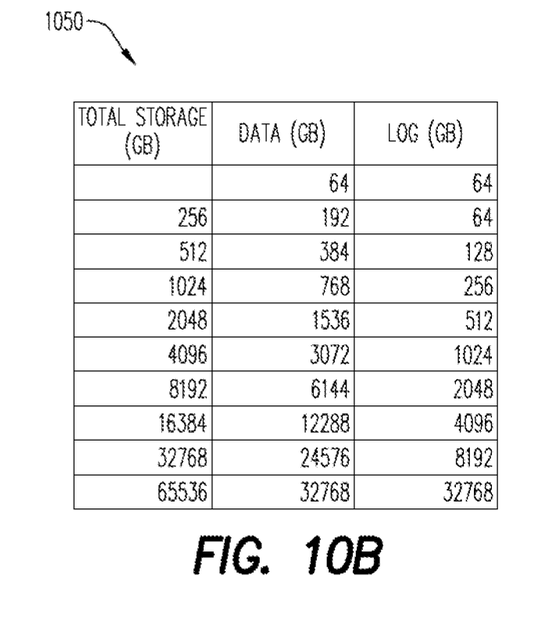
FIG. 10B is a non-exhaustive example of a table according to some embodiments.

The end user may then select in S812 an "advance" selector 912 to generate a second user interface 904. Any suitable selector may be used. It is noted that while two user interfaces are shown herein, the information included on the two interfaces may be included in a single user interface with drop-down menus, radio buttons, user entry fields or any other suitable selector. The second user interface 904 receives, from an end user, a data size 914 (size of logical devices for data) and a log size 916 (size of logical devices for log) at S814. In one or more embodiments, the total storage input 906 is equal to the sum of the data size 914 and the log size 916. In some embodiments, the system 700 may recommend a data size 914 and log size 916 based on the total storage input 906, as shown, for example, in the table 1050 in FIG. 10B. In other embodiments, the end user may input a data size 914 and log size 916 without first receiving a recommendation.

In the non-exhaustive example shown herein, the end user input a total storage input 906 of 512 GB at the first user interface 902, and then split the total storage of 512 GB between data and log such that the data size 914 is 384 GB and the log size 916 is 148 GB.

After entering the data size and log size, the end user may select the "OK" selector 918. The first user interface 902 may then be displayed for the user to select the "Next" selector 920, and other parameters may be received at S816. Next, the multi-PV platform 701 orchestrates the cloud compute environment (virtual machines 950) and storage (PVs 952) via a service orchestration code 742.

In S818, the hyperscaler provisions one or more virtual machines (VMs) 950 to host docker containers. The host docker containers may provide a computation environment for the database server processes.

Then, in embodiments, the decision table 714 is accessed for the pre-defined number of PV disks and selected hyperscaler in S820. A configuration 712 for each of the data size 914 and the log size 916 is determined in S822 based on a mapping of the data size. In the non-exhaustive example shown in FIG. 9B, there are four PV disks 952 (two for data+two for log) for a database instance. The hyperscaler may provision a server of a certain size in terms of compute memory with a required number of threads inside a container within the pod 736, which runs inside a cloud provider VM 950 with the PV disks 952 that have been configured per the mapping at S822.

In S824, the service orchestration code 742 requests the selected hyperscaler 708 to provision and attach each PV disk to the VM 950. In some embodiments, the PV disk 952 may be attached as Linux mount points (see/data1,/data2, . . . ). Continuing with the non-exhaustive example, since the user selected 384 GB for data size 914, the combined size of the PV disks 952 mounted on/data1 and/data2 are equal to 384 GB.

Next, in S826, the service orchestration code 742 together with a database server 728 creates a file system on the PV disk 952. In the non-exhaustive example shown herein, the database server files 954 on PV disks 952 are dataadedv11, datadev21, logde11, logdev21. The database server instance may be installed at S828. Installation may include basic database installation, and the creation of database user login and credentials. At S830, one or more database devices may be created on the PV disks 952. Multiple database devices are created to consume the entire storage volume of the PV disks 952. The database device stores the objects that make up databases. These devices may be logical constructs (e.g., a disk partition or any piece of a disk) used by end users to create objects like database tables to manage their data. The logical devices may be created using the database server files 954. The database server 728 maps the logical devices to physical devices internally. For example, the logical "database device" may be mapped to a physical construct i.e., a file on a directory. The database server 728 may then at S832 provide remote access to the database end users. The database server may provide a SQL language interface (or other suitable interface) to end users to create objects like "databases", "tables", "indexes", "stored procedures" and any other suitable objects.

Figure 11:
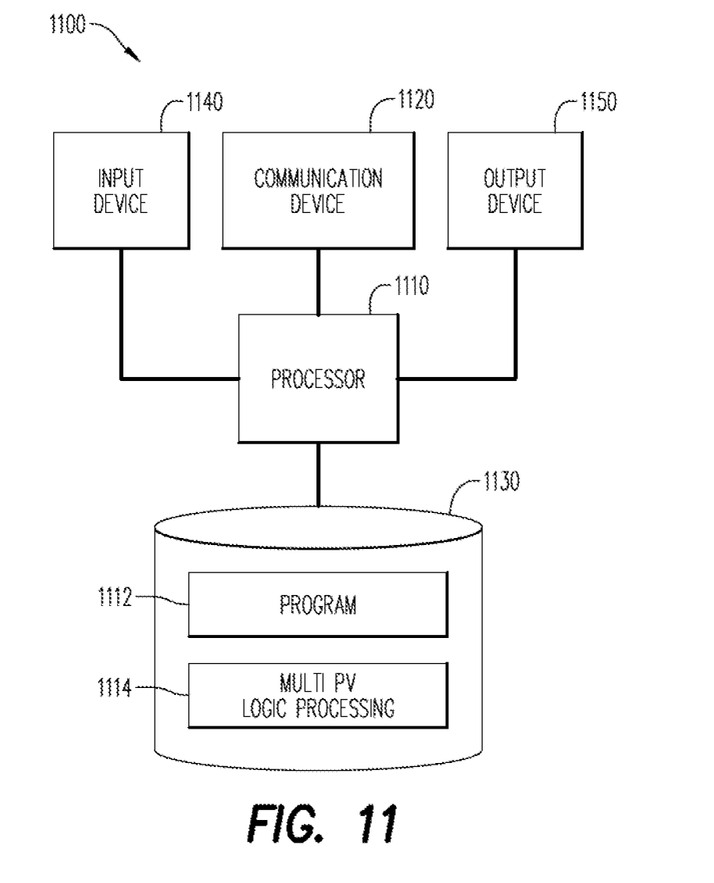
FIG. 11 is an apparatus or platform according to some embodiments.

FIG. 11 is a block diagram of apparatus 1100 according to some embodiments. Apparatus 1100 may comprise a general-or special-purpose computing apparatus and may execute program code to perform any of the functions described herein. Apparatus 1100 may comprise an implementation of one or more elements of system 700. Apparatus 1100 may include other unshown elements according to some embodiments.

Apparatus 1100 includes multi-PV processor 1110 operatively coupled to communication device 1120, data storage device/memory 1130, one or more input devices 1140, and one or more output devices 1150. Communication device 1120 may facilitate communication with external devices, such as application server 720. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to manipulate graphical user interfaces and to input information into apparatus 1100. Output device(s) 1150 may comprise, for example, a display (e.g., a display screen) a speaker, and/or a printer.

Data storage device/memory 1130 may comprise any device, including combinations of magnetic storage devices (e.g., magnetic tape, hard disk drives and flash memory), optical storage devices, Read Only Memory (ROM) devices, Random Access Memory (RAM), cloud platforms (e.g., cloud object stores, cloud-based block storage devices,) etc.

The storage device 1130 stores a program 1112 and/or multi-PV platform logic 1114 for controlling the processor 1110. The processor 1110 performs instructions of the programs 1112, 1114, and thereby operates in accordance with any of the embodiments described herein, including but not limited to process 300/800.

The programs 1112, 1114 may be stored in a compressed, uncompiled and/or encrypted format. The programs 1112, 1114 may furthermore include other program elements, such as an operating system, a database management system, and/or device drivers used by the processor 1110 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 700 may include a processor to execute program code such that the computing device operates as described herein.

All systems and processes discussed herein may be embodied in program code stored on one or more computer-readable non-transitory media. Such non-transitory media may include, for example, cloud computing, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   a memory storing processor-executable program code; and
   a processing unit to execute the processor-executable program code in order to cause the system to:
      receive a range of persistent volume disk size values from a cloud service provider;
      receive a value for an upper bound of a number of persistent volume disks attachable to a virtual machine per the cloud service;
      determine a number of persistent volume disks based on the upper bound, wherein the number is at least two;
      generate a plurality of configurations of the determined number of persistent volume disks, wherein a configuration is provided for each persistent volume disk size value of the range of persistent volume disk size values, and each configuration divides the persistent volume disk size value between two or more persistent volume disks; and
      aggregate the generated plurality of configurations in a decision table.

2. The system of claim 1, wherein the number of persistent volume disks is two.

3. The system of claim 1, wherein the number of persistent volume disks includes a pair of persistent volume disks including a log persistent volume disk for each data persistent volume disk.

4. The system of claim 1, further comprising a user interface and processor-executable program code in order to cause the system to:
   receive, at the user interface, a total storage input; and
   determine a first configuration based on the received total storage input and the decision table.

5. The system of claim 4, further comprising processor-executable program code in order to cause the system to:
   provision the persistent volume disks of the first configuration on a virtual machine;
   create a file system for each provisioned volume disk;
   install at least one database server instance; and
   create one or more database devices on at least one persistent volume disk.

6. The system of claim 4, wherein the total storage input includes a data value and a log value.

7. The system of claim 6, wherein the data value and the log value are one of:
   received at the user interface from a user; and
   recommended by the program code.

8. The system of claim 6, wherein each of the data value and log value has a maximum limit.

9. The system of claim 1, wherein each persistent volume disk has a corresponding input/output operations per second (IOPS).

10. The system of claim 1, wherein each configuration includes persistent volume disks with values that equal or are within a pre-defined upward bound.

11. A computer-implemented method comprising:
    receiving a range of persistent volume disk size values from a cloud service provider;
    receiving a value for an upper bound of a number of persistent volume disks attachable to a virtual machine per the cloud service;
    determining a number of persistent volume disks based on the upper bound, wherein the number is at least two and includes a log persistent volume disk for each data persistent volume disk;
    generating a plurality of configurations of the determined number of persistent volume disks, wherein a configuration is provided for each persistent volume disk size value of the range of persistent volume disk size values, and each configuration divides the persistent volume disk size value between two or more persistent volume disks; and
    aggregating the generated plurality of configurations in a decision table.

12. The computer-implemented method of claim 11, wherein the number of data persistent volume disks is two.

13. The computer-implemented method of claim 11, further comprising:
    receiving, at a user interface, a total storage input including a data value and a log value; and
    determining a first configuration based on the received total storage input and the decision table.

14. The computer-implemented method of claim 13, further comprising:
    provisioning the persistent volume disks of the first configuration on a virtual machine;
    creating a file system for each provisioned volume disk;
    installing at least one database server instance; and
    creating one or more database devices on at least one persistent volume disk.

15. The computer-implemented method of claim 13, wherein the data value and the log value are one of:
    received at the user interface from a user; and
    recommended by a program code.

16. The computer-implemented method of claim 11, wherein each configuration includes persistent volume disks with values that equal or are within a pre-defined upward bound.

17. A non-transitory, computer readable medium having executable instructions stored therein to perform a method associated with a multi-tenant data store, the medium comprising:
- instructions to receive a range of persistent volume disk size values from a cloud service provider;
- instructions to receive a value for an upper bound of a number of persistent volume disks attachable to a virtual machine per the cloud service;
- instructions to determine a number of persistent volume disks based on the upper bound, wherein the number is at least two and includes a log persistent volume disk for each data persistent volume disk;
- instructions to generate a plurality of configurations of the determined number of persistent volume disks, wherein a configuration is provided for each persistent volume disk size value of the range of persistent volume disk size values, and each configuration divides the persistent volume disk size value between two or more persistent volume disks; and
- instructions to aggregate the generated plurality of configurations in a decision table.

18. The medium of claim 17 further comprising:
- instructions to receive, at a user interface, a total storage input including a data value and a log value; and
- instructions to determine a first configuration based on the received total storage input and the decision table.

19. The medium of claim 18, further comprising:
- instructions to provision the persistent volume disks of the first configuration on a virtual machine;
- create a file system for each provisioned volume disk;
- install at least one database server instance; and
- create one or more database devices on at least one persistent volume disk.

\* \* \* \* \*